3,262,984
SILVER HYDROXYFLUOBORATE
Alan Norton Oemler and Leon Singrey Scott, Wilmington, Del., assignors to E. I. du Pont de Nemours and Company, Wilmington, Del., a corporation of Delaware
No Drawing. Filed May 14, 1963, Ser. No. 280,418
6 Claims. (Cl. 260—677)

The present invention relates to silver hydroxyfluoborate, and, more particularly, to aqueous solutions of silver hydroxyfluoborate useful in the separation of unsaturated hydrocarbons.

It has recently been discovered that aqueous solutions of silver fluoborate are outstandingly useful in the separation of unsaturated hydrocarbons such as olefins, benzenes and dienes from saturated aliphatic or alicyclic hydrocarbons. Thus, aqueous solutions of silver fluoborate absorb the unsaturated hydrocarbons through complex formation of the silver fluoborate with the unsaturated hydrocarbons, while the saturated hydrocarbons pass unaffected through the solution. The absorbed olefins can be desorbed substantially in quantitative yields by heating at elevated temperatures, by reduced pressure, through dilution or by a combination of these methods. The major disadvantage of the use of silver fluoborate solutions in the separation of hydrocarbons is their corrosive nature. It is necessary to employ the silver fluoborate solutions at high concentrations in order to utilize them efficiently in the separation of the hydrocarbons. At such high concentrations, i.e., 2 to 12 molar, these solutions rapidly attack even ordinarily corrosion resistant metals. Process equipment for use with the silver fluoborate separation process can, therefore, be constructed only from a few metals and/or plastics which are either very expensive or difficult to fabricate.

It is, therefore, the main object of the present invention to provide a silver salt which in the form of an aqueous solution is capable of separating hydrocarbons efficiently and which is substantially less corrosive than silver fluoborate.

In accordance with the present invention, it was discovered that silver hydroxyfluoborate, $AgBF_3OH$, can be employed in the form of an aqueous solution to efficiently separate fluid saturated and unsaturated hydrocarbons, and that its corrosive action is substantially less than that of silver fluoborate and can, therefore, be successfully used in commercially available equipment.

Silver hydroxyfluoborate is generally prepared by the reaction of silver carbonate with excess hydroxyfluoboric acid which is conveniently obtained by the reaction of boron trifluoride with water in a 1:1.5 molar ratio. Silver hydroxyfluoborate forms stable solutions in water, particularly when employed in high concentrations, which, as indicated below, are preferred in the separation of hydrocarbons. In dilute solutions the silver hydroxyfluoborate partially hydrolyzes and exhibits a higher degree of corrosiveness.

The primary use of silver hydroxyfluoborate is in the separation of saturated and unsaturated hydrocarbons. The silver hydroxyfluoborate solutions are employed in this invention in substantially the same way that silver fluoborate solutions are employed, as described, for example, in U.S. Patent 2,913,505, issued to H. G. Van Raay and U. Schwenk on November 17, 1959. Although the concentration of the silver hydroxyfluoborate can be varied from less than one molar to greater than twelve molar solutions, it is generally preferred to employ solutions having higher concentrations, i.e., from about four to about thirteen molar, since the absorptive capacity of the solution increases with increasing concentrations of the silver salt, whereas the corrosiveness of the solution decreases.

Contrary to silver fluoborate, the absorption of olefines in silver hydroxyfluoborate solutions is not improved significantly by the addition of a secondary metal fluoborate, as described in U.S. 3,007,981, issued to B. B. Baker and D. F. Knaack on November 7, 1961. It was, however, found that the addition of hydroxyfluoboric acid greatly improves the absorptive capacity of the silver salt. The ratio of the silver salt to the hydroxyfluoboric acid is not critical in obtaining an improvement in absorption capacity and an improvement is noted even with small quantities of the acid. Extremely high concentrations of the acid, although not detrimental to the ability of the silver salt to absorb the unsaturated hydrocarbons, do not add substantially to the absorptive capacity of the silver hydroxyfluoborate. In general, the molar ratio of the salt to the acid varies from 1:10 to 10:1. The use of hydroxyfluoboric acid by itself does not result in the separation of saturated and unsaturated hydrocarbons.

Silver hydroxyfluoborate solutions can be employed to separate all types of unsaturated hydrocarbons from saturated hydrocarbons, although, of course, their particular utility resides in separating mixtures of hydrocarbons which can not be separated efficiently by distillation techniques. Thus, silver hydroxyfluoborate solutions can be employed to separate aliphatic and alicyclic hydrocarbons from olefins, such as ethylene and butene-2, from diolefins, such as butadiene and isoprene, from aromatic hydrocarbons, such as benzene and xylene, and from cyclic olefins, such as cyclohexene. Due to the fact that some of the unsaturated hydrocarbons form reversible solid complexes with the silver hydroxyfluoborates, it is possible to employ silver hydroxyfluoborates in the separation of unsaturated hydrocarbons from each other. Thus, conjugated diolefins form reversible solid complexes when contacted with greater than seven molar solutions of silver hydroxyfluoborates and, thus, can be separated from either saturated hydrocarbons or unsaturated hydrocarbons or both. Furthermore, the absorptive capacity of the unsaturated hydrocarbon will vary with each hydrocarbon and depends on the nature of the attraction between the unsaturated hydrocarbon and the silver salt solution which is determined by the structure of the hydrocarbon, so that the hydrocarbons more highly attracted to the silver salt are absorbed to a greater degree. This phenomenon of preferential absorption of unsaturated hydrocarbons can be employed to separate such hydrocarbons, since the more highly absorbed hydrocarbon will replace the less highly absorbed hydrocarbon in the complex. The desorption of the unsaturated hydrocarbon is achieved in accordance with the methods illustrated in the cited patents. Silver hydroxyfluoborate may also be employed in the separations described in copending applications Serial No. 105,873, filed April 27, 1961, Serial No. 237,934, filed November 15, 1962, and Belgian Patent 609,540.

The following tables illustrate the absorption of unsaturated compounds using silver hydroxyfluoborate. The data were obtained by passing a stream of the hydrocarbon through a lithium nitrate solution (of molarity equivalent to that of the silver salt) to prevent water loss and then through the solutions (indicated in the tables) maintained in a standard laboratory glass trap. The hydrocarbon was continuously passed through the glass trap until no further absorption as measured by weight increase, was observed. Adjustment for the water content of the hydrocarbon stream to be separated assured accurate measurements. The values reported in the tables were calculated from these measurements. Unless otherwise indicated, the measurements were carried out at 25° C. and at atmospheric pressure.

Table I

| Molarity of AgBF$_3$OH Solution | Moles of Hydrocarbon Absorbed/g. ion of Ag | | | |
|---|---|---|---|---|
| | Ethylene | Butadiene | Benzene | Cyclohexene |
| 12.5 | 1.03 | (¹) | 1.60 | 2.04 |
| 9.9 | 0.83 | (¹) | | |
| 8.2 | 0.70 | (¹) | 0.36 | 1.42 |
| 5 | 0.45 | | | |
| 4 | | | 0.47 | |
| 3 | | | 0.42 | |
| 2 | | 0.34 | 0.37 | |
| 0.5 | | 0.3 | 0.31 | |

¹ Insoluble complex.

Saturated hydrocarbons, such as ethane and cyclohexane, are not absorbed by solutions of silver hydroxyfluoborate. The effect of hydroxyfluoboric acid on the absorption capacity of a silver hydroxyfluoborate solution is illustrated in Table II.

Table II

| Molarity of AgBF$_3$OH | Molarity of HBF$_3$OH | Moles of Ethylene Absorbed/g. ion of Ag |
|---|---|---|
| 13 | 0 | 1.03 |
| 10 | 3.4 | 1.13 |
| 8.7 | 5 | 1.18 |
| 6.5 | 7.5 | 1.30 |
| 4.3 | 10 | 1.48 |
| 3 | 11.5 | 1.62 |

The desorption of the unsaturated hydrocarbons is illustrated in Table III in which the amount of ethylene retained by a 6.5 M AgBF$_3$OH–7.5 M HBF$_3$OH solution was measured as the temperature of the solution was raised.

Table III

| Temperature, in °C.: | Moles of ethylene retained/g. ion of Ag |
|---|---|
| 25 | 1.3 |
| 50 | 1.0 |
| 85 | 0.65 |
| 100 | 0.4 |
| 120 | 0.3 |

It is to be realized, however, that heating of the complexed solution does not constitute the only means of recovering the hydrocarbon. Thus, in addition to heating or in combination therewith, there may be used reduction in pressure or dilution of the solution, although the last method is least preferred.

The invention is further illustrated by the following examples.

EXAMPLE I

Aqueous HBF$_3$OH was prepared by absorbing gaseous BF$_3$ in cold (0° C.) distilled water until the solution contained 3.8 g. of BF$_3$ per g. of H$_2$O (H$_2$O/BF$_3$=1). Because the above solution was very viscous, distilled water was added to increase the total amount of water by 50% (H$_2$O/BF$_3$=1.5). Analysis of the solution showed that it was 15.3 M in H$^+$, 15.2 M in B, and 45.5 M in F. These results were in good agreement with the formula, HBF$_3$OH.

Solid silver carbonate (Ag$_2$CO$_3$) was added carefully, with stirring, to the 15 M HBF$_3$OH solution in the ratio of 2.3 g. per g. of BF$_3$ present (Ag/BF$_3$=1). Analyses for Ag, B and F indicated that the solution was 13 M in Ag, 14.4 M in B and 42.3 M. in F. Therefore, the solution was 13 M AgBF$_3$OH with a small amount of HBF$_3$OH.

EXAMPLE II

A mixture of 1 ml. of benzene and 20 ml. of cyclohexane was shaken with 2 ml. of a 6.5 molar silver hydroxyfluoborate–7.5 molar hydroxyfluoboric acid solution at room temperature. About half of the benzene was absorbed by the aqueous silver salt solution. Substantially pure benzene was recovered from the aqueous solution by heating to 85° C.

EXAMPLE III

A mixture of ethylene (55 volume percent) and ethane (45 volume percent) was sparged through a series of two containers containing 25 ml. of a 12.4 molar aqueous solution of silver hydroxyfluoborate. The absorbers were at atmospheric pressure and cooled with an ice bath. The gas from the second absorber was analyzed periodically for ethane and ethylene and the total volume of gases not absorbed by the system was measured. The separation was continued until 23 liters of off-gas had been measured. The analysis of gas leaving the second absorber was as follows.

Table IV

| Volume of Off-Gas (Liters) | Composition of Off-Gas | |
|---|---|---|
| | Mol percent of Ethane | Mol percent Ethylene |
| 1 | 99.96 | 0.04 |
| 5 | 97.5 | 2.5 |
| 10 | 90 | 10 |
| 15 | 55 | 45 |
| 23 | 47 | 53 |

After the flow of the gas mixture was discontinued, the solution was heated to 50 to 60° C. The gas desorbed from the solution has a composition of 99.995 mol percent of ethylene and 0.005 mol percent of ethane.

The surprising feature of the silver hydroxyfluoborate is its lack of corrosiveness as compared to silver fluoborate. This is particularly surprising since hydroxyfluoboric acid is a strong acid. The corrosive nature of silver fluoborate is compared to that of silver hydroxyfluoborate in Table V. The data were obtained by placing coupons of 304 stainless steel into the continuously stirred solutions indicated in the table. Corrosion rates (mils/year) were calculated from weight losses.

Table V

| Temp., °C. | 7.1 M AgBF$_4$, mils/yr. | 6.5 M AgBF$_4$-1 M Mg(BF$_4$)$_2$-0.5 M HBF$_4$, mils/yr. | 13.5 M AgBF$_3$OH, mils/yr. | 11.3 M AgBF$_3$OH-2 M HBF$_3$OH, mils/yr. |
|---|---|---|---|---|
| 55 | 3.7 | 5.7 | | |
| 90 | 35.6 | 64.4 | 0.3 | |
| 110 | | | 3.0 | 3.4 |
| 140 | | | 4.7 | 21.0 |

We claim:
1. Silver hydroxyfluoborate.
2. Process for separating fluid hydrocarbon mixtures selected from the group consisting of mixtures of saturated and unsaturated hydrocarbons and mixtures of unsaturated hydrocarbons differing in absorptivity which comprises bringing said mixture into contact with an aqueous solution of silver hydroxyfluoborate, and recovering from the solution the absorbed unsaturated hydrocarbon.
3. Process of separating fluid olefinic hydrocarbons from a fluid hydrocarbon mixture containing said olefinic hydrocarbons, which comprises bringing said mixture into contact with an aqueous solution of silver hydroxyfluoborate, and recovering from the solution said olefinic hydrocarbons.
4. The process of claim 3 wherein the olefinic hydrocarbons are recovered by heating the aqueous silver monohydroxyfluoborate solution.
5. The process of claim 2 wherein the silver hydroxy- fluoborate is employed in combination with hydroxyfluoboric acid.

6. An aqueous solution of silver hydroxyfluoborate and hydroxyfluoboric acid, the concentration of the silver salt being 0.5 to 15 molar, the molar ratio of the acid to the salt being from 1:10 to 10:1.

References Cited by the Examiner

UNITED STATES PATENTS 3,208,820　9/1965　Schwenk et al. _____ 23—59

ALPHONSO D. SULLIVAN, *Primary Examiner.*